United States Patent [19]

Akutsu et al.

[11] Patent Number: 4,935,755

[45] Date of Patent: Jun. 19, 1990

[54] PRINTING HEAD

[75] Inventors: Eiichi Akutsu; Hiroo Soga, both of Kanagawa, Japan

[73] Assignee: Fuji Xerox Co., Ltd., Tokyo, Japan

[21] Appl. No.: 252,317

[22] Filed: Sep. 30, 1988

[30] Foreign Application Priority Data

May 10, 1988 [JP] Japan ............................... 63-111439

[51] Int. Cl.⁵ ............................................ G01D 15/00

[52] U.S. Cl. ...................................... 346/155; 346/151

[58] Field of Search ................ 346/155, 153.1, 139 C, 346/76 PH, 151; 400/119

[56] References Cited

FOREIGN PATENT DOCUMENTS 58-171666 9/1984 Japan .................................. 346/155

2050948A 1/1981 United Kingdom ................ 346/155

*Primary Examiner*—Arthur G. Evans

*Attorney, Agent, or Firm*—Finnegan, Henderson, Farabow, Garrett and Dunner

[57] ABSTRACT

A printing head comprising a thin resin board, printing electrodes positioned in parallel with each other mounted thereon, projections of an electroconductive substance on the electrodes, and slits cut in the head between the projections, extending from the front edge of the resin board to a point midway between the front and rear edges of the resin board. An electrically insulating layer may be deposited on the surface of the head, leaving the projections clear. The thin elastic resin board can deform easily to comply to deformations and irregularities in the printing medium surface. The slits allow removal of foreign matter, such as dust. The slits further allow the electrode projections to contact the printing medium singly or in small groups, across the length of the printing head, rather than all at once, so that the presence of foreign matter on one electrode will not prevent any other electrode projection from making contact. Adequate reliable contact of the electrodes may be maintained to produce high print quality at a reduced stylus pressure, thereby decreasing wear and required maintenance on the printer head and extending its service life.

6 Claims, 2 Drawing Sheets

PRINTING HEAD

BACKGROUND OF THE INVENTION

1. Field of the Invention

The present invention relates to a printing head for applying an electric image signal to a printing medium.

2. Description of the Related Art

In a conventional electric printing method an electric image signal is changed into heat to melt an ink layer and transfer it to paper to form an image thereon.

One conventional printing head for such a method, shown in FIG. 2, comprises printing electrodes 2 and return electrodes 6. Each of the latter has a larger contact area than each printing electrode, and the electrodes are integral with each other, as disclosed in the Japanese Patent Application (OPI) No. 171666/84 (the term "OPI" as used herein means an "unexamined published application"). Since the recording electrodes 2 and the return electrodes 6 are both present on a surface which is put into contact with a printing medium, the pressure contact area of the printing head is large. For that reason, the total contact pressure of the printing head needs to be high, the surface is less likely to be put in contact with the printing medium with a uniform pressure, and the required torque of a drive roller is large. As a result, the reliability of printing performed with the printing head is low.

In another conventional printing head for such a method, shown in FIG. 3, recording electrodes 2 made of metal layers in a pattern and a ceramic layer 8 are provided on a ceramic board 7. Since the end face of the printing head needs to be put in surface contact with a printing medium to print an image, the area of the contact surface becomes very small if the printing head inclines relative to the printing medium. For that reason, the printing head needs to be always kept vertical by using a head holding mechanism of high accuracy.

The present invention was made in order to eliminate the above-mentioned drawbacks of such conventional printing heads.

Accordingly, it is an object of the present invention to provide a printing head, in which the reliability of contact of electrodes with a printing medium is high so that the electrodes can be put in sufficient contact with the printing medium even under low pressure. Further objects are to provide a printing head having a long service life and high processing accuracy.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a printing head is provided, comprising a plurality of printing electrodes in parallel with each other on a thin resin board. Projections are made of an electroconductive substance on the printing electrodes near the front edge of the resin board. Slits are provided in the printing head between the printing electrodes at the front edge of the resin board. The surface of the printing head, with the exception of the electrode projections, may be coated with an electrically insulating layer. It is preferable that the thickness of the thin resin board is 0.1 mm to 7 mm.

The printing head is used to make an image in an electric transfer printing method or an electrostatic printing method. In the electric transfer printing method, for example, the printing head is put in contact with a printing medium comprising a heating layer and a fusible ink layer, so that the plural print-in electrodes of the printing head slide on the printing medium. An electric image signal is applied from the printing head to the heating layer of the printing medium in contact therewith, generating Joule heat in the heating layer to fuse the neighboring ink layer depending on the image. The fused ink layer is transferred to a carrying material such as paper to make the image thereon for recording.

Since the printing electrodes are provided on the elastic, thin resin board, the printing head can be deformed depending on deformation or irregularities, if any, on the surface of the printing medium. For that reason, the projections provided on the printing electrodes near the front edge of the resin board can be kept in continuous contact with the printing medium under low pressure, thereby lengthening the life of the printing head and reducing the wear of the printing medium.

Since the slits are provided between the printing electrodes, the printing electrodes can always be kept, individually or in small groups, in contact with the printing medium. Thus, the printing electrodes are not all separated from the printing medium in case an extraneous substance such as dust, becomes deposited on one of the printing electrodes. Further, the pressure of the contact between the printing head and the printing medium will not become irregular or the contact biased, due to any irregularity in the positions of the printing head and the printing medium in contact with each other, or any fluctuation in the contact pressure. Even if some of the printing electrodes are separated from the printing medium, the separation does not affect the other printing electrodes. If an extraneous substance is present, it will lodge in one of the slits and can be removed. Furthermore, the reliability of the contact of the printing electrodes with the printing medium is enhanced, making it possible to reduce the pressure of the contact. This decreases the wear of the printing medium and increases the reliability and life of the stylus contact portion of the printing head.

Even in the case when the surface of the printing head is coated with the electrically insulating layer, except for the projections made of the electroconductive substance on the printing electrodes, only the projections are put in contact with the printing medium to regulate the area of the contact. For that reason, the pressure of the contact can be maintained very low and the reliability of the contact can be increased.

DESCRIPTION OF THE DRAWINGS

FIG. 1(*b*) shows a cross-sectional view of the printing head;

FIG. 1(*c*) shows a longitudinally sectional view of the printing head;

DETAILED DESCRIPTION OF PREFERRED EMBODIMENT

The present preferred embodiment of the invention is hereafter described in detail with reference to the drawings attached hereto.

Figure 1A:
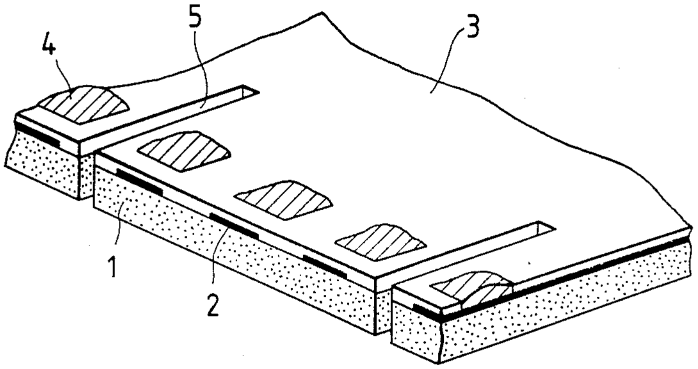
FIG. 1(*a*) shows a perspective view of a printing head which is an embodiment of the present invention.
Figure 1B:
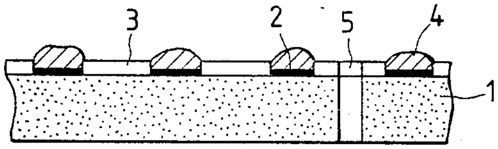
Figure 1C:
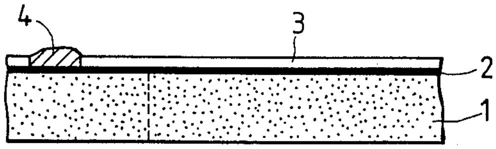
Figure 2:
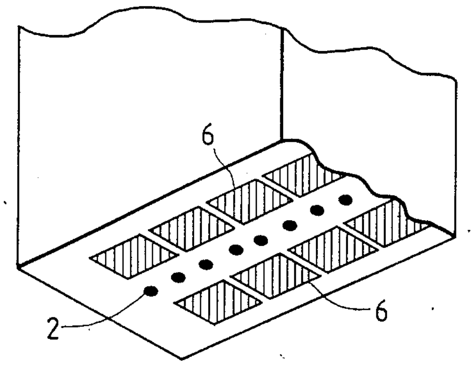
FIG. 2 PRIOR ART
FIG. 2 shows a perspective view of a conventional printing head.
Figure 3:
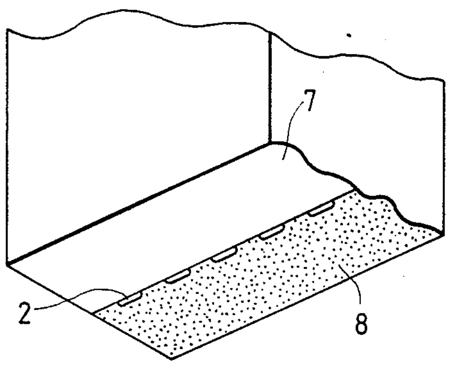
FIG. 3 PRIOR ART
FIG. 3 shows a perspective view of another conventional printing head.

As shown in FIGS. 1(*a*), 1(*b*), and 1(*c*), the printing head comprises a plurality of printing electrodes 2 provided in a pattern on a thin resin board 1 and disposed in parallel with each other. The thin resin board 1 and the printing electrodes 2 can be coated with an electrically insulating film 3 except for a portion of each printing electrode near the front edge of the resin board. The portions of the printing electrodes 2 which are not coated with the electrically insulating film 3 are provided with projections 4 made of an electroconductive substance. The printing head is provided with slits 5 between the printing electrodes 2 at the front edge of the resin board.

It is preferable that the thickness of the thin resin board 1 is 0.1 mm to 7 mm. If the thickness of the board 1 is smaller than 0.1 mm, the printing head cannot be contacted with a printing medium under sufficient elastic pressure. If the thickness of the board 1 is larger than 7 mm, the board acts as a rigid body so that the printing head cannot be maintained in continuous contact with the printing medium at a stable pressure if there are irregularities in the medium. The thin resin board 1 is made of polyester, polyvinyl chloride, polyurethane, polyorganosilicone, polyacetal, polyimide resin, polyamide resin, polyacrylate, polyurea, epoxy resin, elastomer or the like.

The printing electrodes 2 are made of an electroconductive metal such as Ni, Cr, Au, Cu, Ta, Ti, Fe, Al, Mo, W, Zn, Sn, Pt and Pb, an alloy containing such a metal, an electroconductive metal compound such as $VO_2$, $RuO_2$, TaN, $Ta_2N$, $HfB_2$, $TaB_2$, $MoB_2$, $B_4C$, MoB, ZrC, VC and TiC, a mixture containing such a metal or such a metal compound, or the like. The volume resistivity of the printing electrodes 2 is 10 Ω.cm or less. When the printing electrodes 2 are to be provided on the thin resin board 1, an electroconductive film of 0.1 μm to 50 μm in thickness is formed on the board from the above-mentioned electrode material by one of the following methods: foil adhesion, electrolytic plating, non-electrolytic plating, vacuum evaporative deposition, sputtering, printing, physical vapor deposition, chemical vapor deposition, plasma filming or the like, depending on the materials for the resin board and the printing electrodes. The electroconductive film is subjected to patterning by the combination of lithography based on ordinary light, laser light or electron beam, with wet etching, to form the printing electrodes 2. Films may be directly provided in the pattern on the thin resin board 1 to make the printing electrodes 2.

The printing electrodes 2 provided in the pattern on the thin resin board 1 are coated with the electrically insulating film 3, except for the tops of the printing electrodes near the front edge of the resin board. For example, an electrically-insulating photosensitive film (dry film) is fusion-bonded, under pressure, as the film 3 to the thin resin board 1 and the printing electrodes 2. Then, photolithography and wet etching are performed to remove the portions of the film from the printing electrodes. An electrically-insulating non-photosensitive film may be fusion-bonded, under pressure, as the film 3 to the thin resin board 1 and printing electrodes 2. This is followed by photolithography and dry etching with the use of a resistant film to remove those portions of the film from the printing electrodes which correspond to the printing medium contact part of the printing head, to expose the portions of the printing electrodes. It is preferable that the thickness of the electrically insulating film 3 is 5 μm to 50 μm.

The exposed portions of the printing electrodes 2 are provided with the projections 4 made of the electroconductive substance. Each of the projections 4 may have any size as long as the projections are maintained away from each other. However, it is preferable that the cross-sectional shape of each projection 4 is quadrangular or circular and the length of each side of the cross section of the projection or the diameter of the cross section is nearly equal to the width of the printing electrode 2. For example, an electroconductive metal such as Ni, Cr and Cu is deposited on the exposed portions of the printing electrodes 2 by electrolytic plating to provide the projections 4 and make the thickness of each of them larger than that of the electrically insulating film 3. It is preferable that the thickness of each of the projections 4 is larger by 2.0 μm to 100 μm, preferably in the range 10 μm to 40 μm, than that of the electrically insulating film 3. The projections 4 serve to regulate the contact area of each printing electrode 2 to the printing medium in order to print dots accurately. In the embodiment the projections 4 are disposed in a row parallel with the contact surface of the printing head. The present invention, however, is not confined thereto but may be otherwise embodied so that the projections are disposed in a zigzag line and all located at the turning points of the line. Or the projections may be disposed in a zigzag line, some of the projections being located at the turning points of the line and the others of the projections located at the other portions of the line.

The slits 5 are provided in the resin board between the printing electrodes 2 by rotary cutting with a cutting disk, laser processing, dry etching, fluid cutting or the like. It is preferable that the length of each of the slits 5 be 5 mm to 40 mm. However, the length of each slit 5 is relatively unlimited, and can be optionally determined depending on the form of the exposed portion of each printing electrode 2.

The following examples of the printing head of the present invention are described below.

EXAMPLE 1

Films of chromium and copper were deposited at thicknesses of 500 Å and 3.0 μm, respectively, on one side of a polyester resin board of 1.5 mm in thickness, by vacuum evaporative deposition at a board temperature of 110° C., forming an electroconductive layer. The electroconductive layer was subjected to patterning by photolithography and then etched so that printing electrodes of 50 μm in width were provided at intervals of 125 μm in a striped pattern. An electrically insulating film of 3,000 Å was then deposited on the polyester resin board and the printing electrodes by the high-frequency sputtering of $SiO_2$ at a board temperature of 100° C. Openings, each of which had a square cross-sectional shape 60 μm on each side, were cut in the electrically insulating film on the printing electrodes by photolithography and etching. Nickel was deposited in the openings on the printing electrodes by electrolytic plating, providing projecting contact electrodes, which projected by 15 μm from the electrically insulating film and had a square cross-sectional shape 70 μm on each side over the film. The projecting contact electrodes were then cut off at a height 15 μm below the tops of the electrodes. Slits of 4 mm in length and 30 μm in width were made at intervals of 2.5 mm between the contact electrodes by a rapidly rotating cutter employing a diamond blade. A printing head was thus manufactured. The stability of electric connection between the contact electrode of the printing head and an aluminum drum having a diameter of 120 mm and rotating at a circumferential speed of 80 mm/sec. was evaluated as the printing head was put in contact with the drum at an angle of 32° thereto, under various levels of pressure. In TABLE 1, the evaluation is shown in terms of the number of electric disconnections between the printing head and the aluminum drum lasting for 2 msec or more, over a 20 second period of contact.

EXAMPLE 2

Films of chromium and nickel were deposited at thicknesses of 1,000 Å and 2.5 μm, respectively, on one side of a polyimide resin board of 2 mm in thickness, by high-frequency sputtering, forming an electroconductive layer. The electroconductive layer was subjected to patterning by photolithography and etched so that printing electrodes of 60 μm in width were provided at intervals of 100 μm in a striped pattern. A polyimide oligomer was applied to the polyimide resin board and the printing electrodes and tentatively dried. Openings, each of which had a square cross-sectional shape of 55 μm on each side, were made in the tentatively dried polyimide oligomer by photolithography and etching. After that, the polyimide oligomer was hardened by heating so that an electrically insulating polyimide film of 2.0 μm in thickness was made. The assembly of the polyimide resin board, the printing electrodes and the electrically insulating polyimide film was then put in a plating bath comprising a mixture of tungsten and chromium so that projecting contact electrodes, which projected by 15 μm from the electrically insulating film, were provided in the openings of the film by electrolytic plating. The projecting contact electrodes were then cut off at a height 15 μm below the tops of the electrodes. Slits of 6 mm in length and 20 μm in width were made at intervals of 500 μm between the contact electrodes by a rapidly rotating cutter employing a diamond blade. A printing head was thus manufactured. The printing head was subjected to the same evaluation as the Example 1. The result of the evaluation is shown in TABLE 1.

COMPARATIVE EXAMPLE 1

An alumina ceramic board of 2 mm in thickness was used instead of the polyester resin board in Example 1. The same printing electrodes, electrically insulating film, projecting contact electrodes and slits of Example 1 were provided. A printing head was thus manufactured. The printing head was subjected to the same evaluation as Example 1. The result of the evaluation is shown in TABLE 1.

COMPARATIVE EXAMPLE 2

An alumina ceramic board of 2 mm in thickness was used instead of the polyimide resin board in Example 2. The same printing electrodes, electrically insulating film and projecting contact electrodes used in Example 2 were provided. However, no slit was provided. A printing head was thus manufactured. The printing head was subjected to the same evaluation as in Example 1. The result of the evaluation is shown in TABLE 1.

TABLE 1

NUMBER OF DISCONNECTS PER INCREASING CONTACT PRESSURE

| | Contact pressure (g/cm$^2$) | | |
|---|---|---|---|
| | 50 | 200 | 400 |
| Example 1 | 2 | 0 | 0 |
| Example 2 | 1 | 0 | 0 |
| Comparative example 1 | 235 | 67 | 12 |
| Comparative example 2 | 385 | 92 | 27 |

It is seen from TABLE 1 that the electric connectability of the printing heads manufactured in accordance with the present invention is less dependent on the contact pressure of the printing heads and each of the heads can therefore be put in reliable contact with a printing medium even under low pressure.

Additional advantages and modifications will readily occur to one skilled in the art. The invention in the broader aspects is, therefore, not limited to the specific details, representative apparatus and illustrative examples shown and described. Accordingly, departure may be made from such details without departing from the spirit or scope of applicant's general inventive concept.

What is claimed is:

1. A printing head, comprising:

a resin board having a surface with a front and rear edge;

a plurality of spaced elongated printing electrodes, positioned in parallel with each other on the surface of said resin board, said elongated electrodes extending from the front edge to the rear edge of said resin board;

an electrically insulating film layer coating the surface;

each of said electrodes including a projected portion of an electroconductive substance penetrating and extending out of the film layer near the front edge of the resin board; and a plurality of parallel slits fully penetrating the resin board and the film layer, situated between and parallel to said electrodes, extending from the front edge of the resin board and film layer to a point intermediate the front and rear edges of the resin board and film layer.

2. The printing head of claim 1, wherein said thin resin board has a thickness of 0.1 mm to 7 mm.

3. The printing head of claim 1, wherein the thin resin board is formed of a resin selected from the group consisting of polyester, polyvinyl chloride, polyurethane, polyorganosilicone, polyacetal, polyimide, polyamide, polyacrylate, polyurea, and expoxy resins.

4. The printing head of claim 1, wherein the printing electrodes are formed of an electroconductive material selected from the group consisting of Ni, Cr, Au, Cu, Ta, Ti, Fe, Al, Mo, W, Zn, Sn, Pt, and Pb, an alloy thereof $VO_2$, $RuO_2$, TaN, $Ta_2N$, $HfB_2$ $TaB_2$, $MoB_2$ $B_4C$, MoB ZrC, VC, and TiC, and a mixture thereof.

5. The printing head of claim 1, wherein said projections are made of an electroconductive substance and have a thickness 10 μm to 40 μm greater than said electrically insulating film.

6. The printing head of claim 1, wherein said electrically insulating film is generally of a thickness 5 μm to 50 μm.

* * * * *